June 23, 1925.　　　F. H. HOPKINS ET AL　　　1,543,159
HEADLIGHT MECHANISM
Filed April 23, 1924　　　2 Sheets-Sheet 2
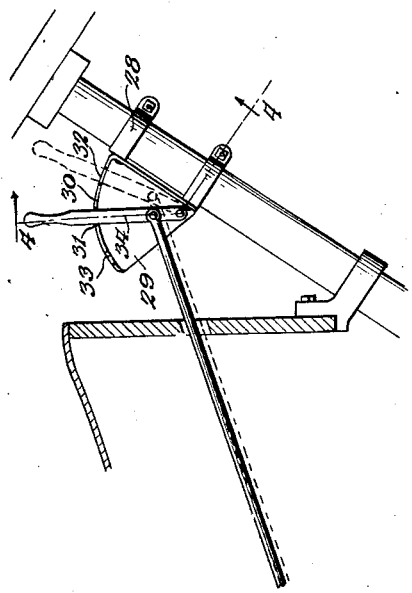
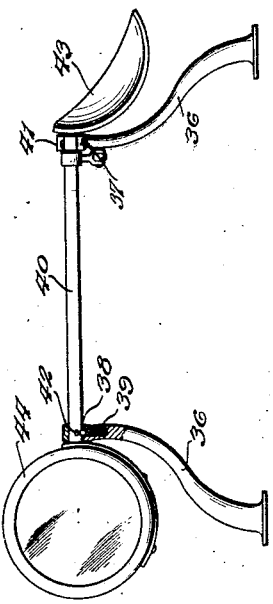
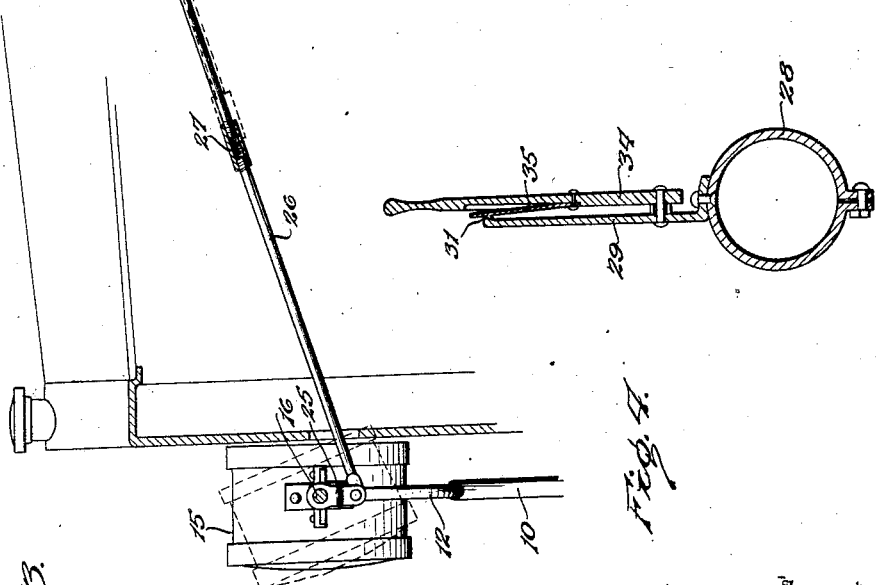
Inventor
F. H. Hopkins
W. W. Moody
By Lacy & Lacy, Attorneys Patented June 23, 1925.

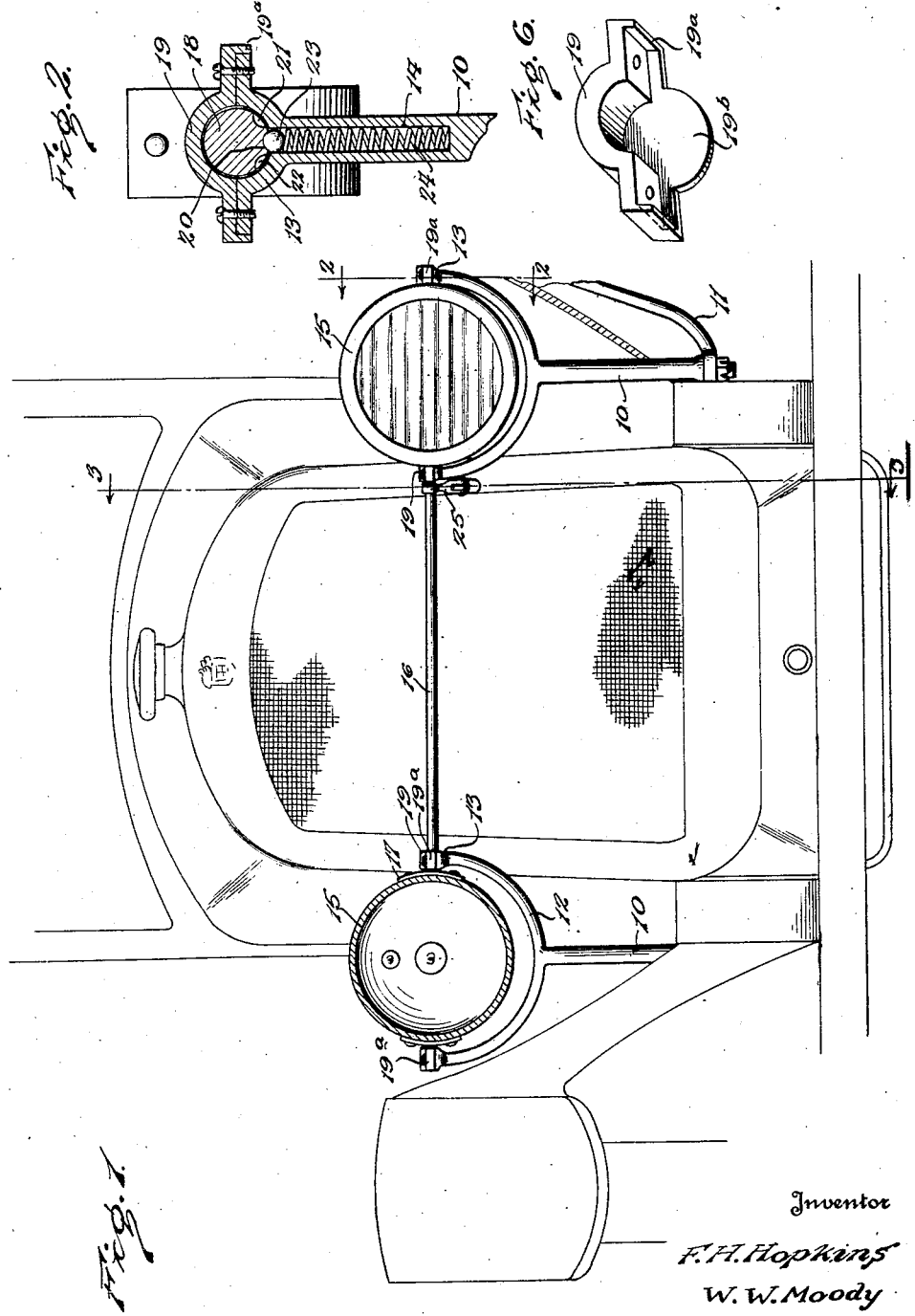

1,543,159

UNITED STATES PATENT OFFICE.

FREDRICK H. HOPKINS AND WINDELL W. MOODY, OF KANSAS, ILLINOIS.

HEADLIGHT MECHANISM.

Application filed April 23, 1924. Serial No. 708,415.

*To all whom it may concern:*

Be it known that we, FREDRICK H. HOPKINS and WINDELL W. MOODY, citizens of the United States, residing at Kansas, in the county of Edgar and State of Illinois, have invented certain new and useful Improvements in Headlight Mechanism, of which the following is a specification.

This invention relates to an improved headlight mechanism for motor vehicles and seeks, among other objects, to provide a mechanism wherein the headlights may be tilted upwardly for illuminating road signs or the like, may be tilted downwardly so as not to blind an on-coming driver, or may be directed straight ahead for illuminating the roadway in the customary manner.

The invention seeks, as a further object, to provide a mechanism wherein the headlights will be automatically and yieldably locked in each of the three positions noted.

Another object of the invention is to provide a mechanism wherein the headlights may be easily and quickly tilted without inconvenience to the driver and wherein the control means for the headlights will provide an auxiliary locking means for securing the headlights in set position.

And the invention seeks, as a still further object, to provide a mechanism which will be characterized by structural simplicity and which may be readily installed.

Other and incidental objects will appear hereinafter.

In the drawings:

Figure 1 is a front elevation showing my improved headlight mechanism applied to a conventional motor vehicle, Figure 2 is an enlarged sectional view taken on the line 2—2 of Figure 1, looking in the direction of the arrows, and particularly showing the detents employed for holding the headlights in set position, Figure 3 is a sectional view on the line 3—3 of Figure 1, looking in the direction of the arrows, and particularly showing the control means for the headlights, Figure 4 is a detail sectional view on the line 4—4 of Figure 3, looking in the direction of the arrows, Figure 5 is a detail perspective view showing one of the bearing caps employed, and Figure 6 is an elevation showing a slight modification of the invention.

In carrying the invention into effect, we employ headlight brackets 10 which may, as shown in Figure 1, be bolted or otherwise secured to the front fender brackets 11 of the vehicle or, if preferred, the brackets 10 may be fastened directly to the side bars of the chassis frame. The vehicle shown is, of course, conventionally illustrated. At their upper ends, the brackets 10 are forked to produce arms 12 terminating at their upper ends in bearings 13 and formed in each of said arms is, as particularly shown in Figure 2, an axial recess 14. Accommodated between the fork arms of the brackets are headlights 15 which may be of any approved design and rigidly connecting the headlights with each other is a cross shaft 16 provided at its terminals with end plates 17 riveted or otherwise secured to the headlights. Similarly mounted upon the headlights at the outer sides thereof are trunnions 18 which, with the shaft 16, are accommodated by the bearings 13 of the fork arms 12, and secured to said bearings to fit over the shaft as well as over said trunnions, are removable bearing caps 19. All of said caps are provided with end flanges 19ª overhanging the ends of the bearings while the caps which overlie the trunnions 18 are, as shown in Figure 5, further provided with side plates 19ᵇ overlying the outer sides of the bearings for excluding moisture as well as dust and dirt. Thus, the headlights may be readily arranged in position to be rotatably supported by the brackets, and formed in the shaft 16 as well as in the trunnions 18 at each of the bearings 13 is, as shown in detail in Figure 2, a series of spaced hemi-sperical sockets indicated for convenience at 20, 21 and 22. Partially accommodated in the recesses 14 of the fork arms are ball detents 23 and arranged within the recesses to act against said detents are springs 24 pressing the detents upwardly to selectively seat in said sockets.

Fixed to the shaft 16 near one end thereof is an arm 25, to which is connected a control rod 26. As brought out in Figure 3, the rod 26 extends through the shell of the radiator of the vehicle and through the instrument board and is preferably formed of companion sections connected by a right and left threaded sleeve 27. Thus, the length of the rod may be adjusted. Removably clamped about the steering post of the vehicle are spaced straps 28 connected by a sector 29 on which is formed a flange 30 having notches 31, 32 and 33 therein. Pivoted upon the sector is a hand lever 34 carrying a spring 35 disposed to ride against the flange 30 of the sector for selective engagement in said notches and, as will be observed, the control rod 26 is connected to said lever. Furthermore, attention is directed to the fact that the sector 29 is disposed at the forward side of the steering post in a position out of the way while, at the same time, the driver of the vehicle may readily reach the hand lever 34.

As will now be seen, when the spring 35 of the hand lever 34 is engaged in the notch 31 of the sector 29, the headlights 15 will, as shown in the drawings, be directed straight ahead for illuminating the roadway in the usual manner. In this position of the headlights, the detents 23 will be seated in the sockets 20 for yieldably holding the headlights against oscillatory vibration. The headlights will thus, under ordinary circumstances, function in a manner similar to the usual headlights of a vehicle. However, should it be desired to illuminate a road sign, for instance, or any other object elevated with respect to the roadway, the hand lever 34 is grasped and swung forwardly until the spring 35 thereof engages in the notch 33 of the sector. When the headlights are thus swung, the detents 23 will be caused to ride out of the sockets 20 of the shaft 16 and trunnions 18, and, when the headlights are brought to elevated position by the hand lever, said detents will seat in the sockets 21 for again yieldably locking the headlights against vibration. Thus, the headlights will be held elevated. On the other hand, when meeting an on-coming car or when driving on a foggy night, for instance, the hand lever 34 is swung rearwardly to engage the spring 35 thereof in the notch 32 of the sector and rock the headlights 15 downwardly. In this position of the headlights, the detents 23 will be seated in the sockets 22 of the shaft 16 and trunnions 18 for holding the headlights against vibration and, as will be seen, the rays of the headlights will, when the headlights are thus turned downwardly, be prevented from blinding an on-coming driver while, at the same time, the roadway will be illuminated immediately in advance of the vehicle so that the operator of the vehicle may steer with facility. We accordingly provide a particularly efficient mechanism for the purpose set forth and, as will now be appreciated, a mechanism which will tend to reduce accidents caused by improper or misdirected headlight illumination. The sector 29 with its notched flange 30 and the coacting spring 35 upon the hand lever 34 are provided principally as an auxiliary safety locking means for the headlights. In other words, the detents 23 are entirely sufficient to lock and rigidly hold the headlights in adjusted position when swung, but to obviate any possibility of the headlights being jolted out of set position or otherwise unintentionally swung or vibrated, the sector and spring are employed.

In Figure 6 of the drawings, we have illustrated a slight modification of the invention. In this modified structure, we employ bearing brackets 36 which may be appropriately mounted upon the vehicle at the front thereof in a manner similar to the brackets 10 and formed on the brackets 36 at the upper ends thereof are bearings 37 with which are associated ball detents 38 actuated by springs 39, the parts 37, 38 and 39 being identical with like parts of the preferred construction. Journaled in the bearings 37 is a cross shaft 40 held by removable bearing caps 41 and formed in the shaft to accommodate the detents 38 are sockets 42, as disclosed in the preferred construction. Fixed upon the shaft 40 at its ends are cupped end plates 43 shaped to fit the casings of a pair of headlights such as conventionally illustrated at the left of Figure 5, at 44. The headlights are riveted or otherwise secured to the end plates so that when the shaft 40 is rocked the headlights will be tilted. Otherwise, this modified structure is identical with the preferred form of the invention and further description is accordingly believed unnecessary.

Having thus described the invention what we claim is:

1. In a headlight mechanism, the combination of a bracket formed at its lower end for attachment to a support and provided at its upper end with a fork having fork arms terminating in companion bearings, one of said fork arms being provided with a recess opening through the bearing of said arm, a headlight having trunnions journaled in said bearings, means for rocking the headlight, one of said trunnions being provided with spaced sockets, and a spring pressed ball detent accommodated in said recess to selectively seat in said sockets for locking the headlight when rocked.

2. In a headlight mechanism, the combination of a pair of upstanding brackets provided at their upper ends with forks having fork arms terminating in alined bearings, a shaft journaled in the bearings of the innermost of said arms, headlights carried by said shaft and accommodated in said forks, trunnions carried by the headlights and journaled in the bearings of the outermost of said fork arms, bearing caps secured to the latter bearings to overlie said trunnions and provided with flanges confronting the ends of the trunnions for limiting the trunnions and said shaft against endwise movement in opposite directions and holding the headlights against sidewise play, and means for rocking the head lights.

In testimony whereof we affix our signatures.

FREDRICK H. HOPKINS.
WINDELL W. MOODY.